United States Patent [19]

Schellenberg

[11] Patent Number: 4,562,158
[45] Date of Patent: Dec. 31, 1985

[54] SOLID PHASE SCINTILLATION COUNTING METHOD

[75] Inventor: Karl A. Schellenberg, Virginia Beach, Va.

[73] Assignee: Eastern Virginia Medical Authority, Norfolk, Va.

[21] Appl. No.: 286,926

[22] Filed: Jul. 27, 1981

[51] Int. Cl.$^4$ .............................................. G01T 1/20
[52] U.S. Cl. .................................. 436/57; 250/361 R; 250/483.1; 422/56
[58] Field of Search ............................ 436/58, 57, 902; 252/301.17; 250/483.1, 361 R; 422/56, 57, 58

[56] References Cited

U.S. PATENT DOCUMENTS

| | | | |
|---|---|---|---|
| 3,457,180 | 7/1969 | Kretz et al. | 252/301.17 |
| 3,676,360 | 7/1972 | Shamoo | 250/483.1 X |
| 3,690,832 | 9/1972 | Plakas | 436/58 X |
| 3,928,227 | 12/1975 | Sena et al. | 250/483.1 X |
| 4,127,499 | 11/1978 | Chen et al. | 252/301.17 |
| 4,292,272 | 9/1981 | Kitajima et al. | 422/57 |
| 4,293,436 | 10/1981 | Fost | 436/57 X |
| 4,358,401 | 11/1982 | O'Brien et al. | 252/301.17 X |

OTHER PUBLICATIONS

Blair et al., Analytical Biochemistry, 3, 221–229 (1962).
Seliger et al., Analytical Chemistry, vol. 31, No. 9, 1959, pp. 1607–1608.

Primary Examiner—Arnold Turk
Attorney, Agent, or Firm—Beveridge, DeGrandi & Weilacher

[57] ABSTRACT

A solid phase scintillation counting method is provided wherein a scintillating material is added to an inert carrier and a radioactive substance is caused to contact the carrier either before or after the scintillating material has been applied. The treated carrier is then counted in the solid state in a liquid scintillation counter without the necessity of dissolving the radioactive substance in a liquid solution containing a scintillator. The invention provides a highly efficient and very convenient method for counting low energy radioactive isotopes such as $^{14}C$ and $^3H$.

15 Claims, No Drawings

SOLID PHASE SCINTILLATION COUNTING METHOD

INTRODUCTION

This invention concerns the solid phase scintillation counting of low energy radioactive isotopes including $^{14}C$ and $^{3}H$.

BACKGROUND OF THE INVENTION

Scintillation counting involves the process of measuring radioactivity by means of converting radioactive energy into light pulses. A scintillator is a chemical used to convert radioactive pulses into light. When ionizing particles such as alpha, beta, or gamma rays are absorbed by the scintillator, some of the energy acquired by the scintillator is emitted as a pulse of visible or near ultra-violet light. The light is picked up by a photomultiplier tube and the combination of a scintillator and a photomultiplier tube is called a scintillation counter.

Typically, a gamma scintillation counter consists of a sodium iodide crystal with a well drilled into it in which a vessel containing the gamma emittor is placed. The gamma radiation passes through the walls of the vessel and into the crystal causing scintillation. For the counting of very low energy beta emittors such as $^{3}H$, $^{14}C$ and $^{35}S$, the liquid scintillation counter was developed. According to procedures heretofore known in the art, the counting of these isotopes involves dissolving the radioactive isotope in a liquid solution containing the scintillator and placing the vessel containing this mixture into the instrument with a photomultiplier tube to observe the scintillations. The beta emittors emit an energy too weak to pass through the walls of any of the vessels so that the scintillator must be in very close proximity to the radioactive isotope.

Liquid scintillation counting has been used for several decades to count $^{14}C$ and $^{3}H$. In the case of thin layer and paper chromatography, the strips have been customarily eluted with a liquid scintillation solution and subsequently counted. This method has entailed the accumulation of large volumes of toxic and radioactive solvents which require disposal at great expense. As will be seen, the present invention provides a method for directly counting paper or thin layer chromatographs and other treated carriers in a solid state, thereby eliminating the problems of disposal of large volumes of radioactive liquid waste.

Previous attempts have been made in the art to count radioactive substances without adding scintillation elutent. A method for counting $^{32}P$ without added scintillation fluid by use of the Cerenkov radiation given off by the high energy emittor is well known in the literature. Likewise, the somewhat cumbersome method of detecting $^{3}H$ or $^{14}C$ by autoradiography is known and involves placing a photographic film adjacent to a sheet containing the radioactive material. Recent improvements in this technique have incorporated scintillators to mediate the photographic detection of radioactivity.

As will be seen from the following description, the present invention represents a significant improvement over the prior art methods for counting radioactive emissions. The method of solid phase scintillation counting which has been discovered provides numerous advantages which include the elimination of the possibility of contamination by radioactive liquid, the avoidance of accumulating large volumes of radioactive waste, and the allowance for direct re-use of containers without the need for cleaning.

SUMMARY OF THE INVENTION

According to the invention, solid phase scintillation counting can be carried out by adding a scintillating material, optionally in solution in a solvent, to an inert carrier. A radioactive substance is caused to contact the carrier either before or after the scintillating material has been added. The treated carrier is then counted in the solid state and in the usual manner with a liquid scintillation spectrometer. The invention provides a highly efficient and very convenient method for counting low energy radioactive isotopes such as $^{14}C$ and $^{3}H$.

DESCRIPTION OF THE PREFERRED EMBODIMENT

The scintillation counting technique of the present invention can be carried out without the necessity of dissolving a radioactive isotope in a liquid solution containing a scintillator. The radioactive substance can be added directly to an inert carrier, either before or after the carrier has been treated with a scintillating material, and the isotope-laden carrier is then placed in a liquid scintillation counter and the radioactivity is detected or measured.

The practical applications for such a method will be readily apparent to those skilled in the art. The examples include the detection and measurement of radioactive contamination in and around nuclear power plants or other sources of radiation, and the detection and measurement of radioactivity in laboratories or hospitals. The invention allows for isotopes, in whatever physical form and either in a pure or combined state, to be determined efficiently and conveniently.

According to the invention, the radioactive substance will be brought into contact with an inert solid carrier that is capable of carrying the substance. Different means of contacting the carrier with the radioactive substance will be readily apparent to those skilled in the art. If the radioactive substance is in a liquid state, a simple touching of the carrier with the liquid can be sufficient. In order to enhance the receptivity of the carrier for a liquid radioactive substance, the carrier may be treated, as by adding a detergent. If the radioactive substance is in a gaseous state, it also may be advantageous to treat the carrier in ways known to the art for making it more receptive to the substance. It will also be readily apparent that the manner in which the carrier and radioactive substance are associated can be by any suitable manner, such as by absorption, adsorption, or chemical combination.

The scintillating material can be added to the carrier either before or after the radioactive substance has become associated. The method of applying the scintillating material to the inert carrier can take any form, including swabbing with a cotton tip applicator, spraying, dipping, brushing, rolling on, or grinding on. When the scintillating material is added before the radioactive substance is brought into contact with the carrier, the scintillating material and a fluid carrier substance, in the form of a liquid, particles, fibers or the like, can be first mixed, and a solid carrier can then be formed, which will include the scintillating material in a substantially homogeneous fashion. The manner of mixing and forming a carrier of this sort, as well as any solvents, fillers, solidifying agents, modifiers, etc., which can aid in the formation and improve the properties of the solidified carrier substance can be selected in accordance with conventional techniques. In a particularly preferred embodiment, the resulting solidified carrier will be in the form of an elongated, rectangular and substantially two-dimensional strip and a detergent will have been added to the carrier substance to facilitate the absorption or adsorption of the radioactive substance to the strip.

It is preferred that the scintillating material will be added to the carrier in the form of a solution. Conventional methods are known for preparing suitable solutions of scintillating materials and such methods can be employed in the practice of the present invention. Suitable additives can be admixed to the solution before the solution is applied to the carrier, or the additives may be applied to the carrier in a separate step, either before or after the scintillating material is applied.

It is preferred that the solvent of the scintillator solution be completely dried after it is applied to the carrier and before the radioactivity is determined, but the invention can also be practiced when a small amount of solvent remains on the carrier. It would also be within the scope of the invention to add the scintillating material in solution without subsequently drying the solvent which is retained on the carrier. The drying step can be executed by any conventional drying methods, including the application of heat or dry air, or by simply exposing the carrier to the atmosphere.

Scintillating materials are known for their ability to absorb energy from ionizing particles and correspondingly emit a pulse of light. Typical scintillating materials suitable in the practice of this invention include diphenyloxazole (PPO); 2-(4'-t-butylphenyl)-5-(4''-biphenylyl)-1,3,4-oxadiazole (butyl PBD); and naphthalene. When the scintillating material is prepared in solution, any inert organic solvent may be employed, for example, toluene, dimethylformamide, xylene, dioxane, and isopropanol. The use of PPO in dimethylformamide has been found to be especially suitable for the determination of $^{14}C$ and $^{3}H$. The concentration of scintillating material in the solvent can range from near 0% to near 100%, and a particularly preferred concentration of PPO in dimethylformamide is about 40%. Any suitable scintillating material may be used for purposes of this invention.

The solid inert carrier suitable in the practice of the invention will be receptive to the radioactive substance and the scintillator. Preferred carriers include thin layers or paper suitable for use in thin layer or paper chromatography. Other suitable carriers include blotting paper, plastic sheets, cellulosic fibers, and silica gel. Although a preferred embodiment involves carriers in substantially two-dimensional form, it will be readily apparent that the carriers may take the shape of three-dimensional forms such as spheres. If two-dimensional carriers are employed, such as thin layers or paper, they can be segmented and placed in dry, empty scintillation vials before being introduced into the liquid scintillation spectrometer. The carrier can be segmented at any time prior to the introduction into the spectrometer, and the segmenting step can be executed conveniently after the solvent is dried, if a solvent is used.

In a particularly preferred embodiment, impregnated strips can be used in a wipe test for the determination of contamination. The scintillating material can be applied to the carrier by any one of the aforementioned methods, including melting a carrier substance such as cellulosic fibers or other particulate carrier substance, and then admixing the scintillating material to form a substantially homogeneous sheet or other suitable form of inert carrier. The impregnated strips are made more versatile by including a small amount of detergent in addition to the scintillating material. The presence of the concentrated detergent improves the ability of the strips to readily receive water or aqueous solutions as well as non-polar substances. Any inert detergent can be used in order to increase the receptivity of the carrier, and an example of a suitable nonionic detergent is Triton X-100. The strips are used to contact surfaces which may contain radioactive substances or solutions, and the radioactivity is measured in a solid state in a liquid scintillation counter.

A description of a liquid scintillation counter that can be used for counting the low energy radioactive isotopes according to the present invention has been set forth hereinabove. Any liquid scintillation counters known in the art of scintillation counting are suitable in the practice of the invention, and examples of suitable counters are the Beckman LS 250 or LS 100 liquid scintillation counters. It will usually be advantageous to place the carrier in a scintillation vessel, such as a vial, before it is introduced into the counter. Further, the use of counters having modifications which could be readily appreciated by those having skill in the art in order to facilitate the practice of the present invention would be within the scope of the invention.

EXAMPLE 1

Strips (0.8×3 cm) of Whatman #3 MM paper were either impregnated with 60,000 dpm $^{14}C$ benzoate, 58,000 dpm $^{3}H$ thymidine, or used as in the case of background determinations. The strips were then treated as shown in the Table, dried, placed in scintillation vials, and counted in a Beckman LS 250 or LS 100 liquid scintillation counter. Initial runs show that PPO was a relatively good scintillator and that the counting efficiency was best if dimethylformamide was used. The addition of other scintillators such as butyl PBD or naphthalene showed slight improvement of efficiency with $^{3}H$. The results of runs made in accordance with Example 1 are reported in the Table.

EXAMPLE 2

In this example, a series of runs based upon Example 1 were carried out in which different percentages of PPO in a dimethylformamide solution were applied to the carrier. As shown in the Table, a mixture of 40% PPO and 60% dimethylformamide was found to be optimal in determining $^{14}C$ and $^{3}H$ in paper chromatography and thin layer chromatography. Use of Eastman Cellulose 13254 or Bakerflex Silica Gel 1B-F thin layer chromatogram sheets in place of the Whatman #3 MM paper gave similar results. Counting of the isotopes in narrow windows gave $^{14}C$ efficiency of 18% with 17% spillover into $^{3}H$, and $^{3}H$ efficiency of 3.9% with 13% spillover into the $^{14}C$ channel. A chromatogram of thymidine glycol with a Geiger counter graph of $^{14}C$ was peaked together with the solid phase scintillation counting of the same portion. It was found that the solid scintillation counting gave results substantially identical to those obtained by scanning with the Geiger counter. Using this method, $^{14}C$ was counted with an efficiency of over 50% and tritium with efficiency of over 6%. Using the proper windows in the scintillation spectrometer, the $^{14}C$ and tritium could be counted in the same strip. The results of runs made in accordance with Example 2 are reported in the Table.

TABLE

| Example | Changes | CPM Background | Efficiency $^{14}C$ | $^{3}H$ |
|---|---|---|---|---|
| 1 | Strips treated with $^{3}H$, and 50% PPO in toluene | 21 | 52 | 2.2 |
|  | + glycerin |  |  | 0.4 |
|  | + DMSO |  |  | 1.8 |
|  | + DMF |  |  | 3.4 |
|  | + Butyl PBD 2% |  |  | 3.3 |
|  | + naphthalene 2% |  |  | 2.6 |
| 2 | No treatment | 24 | 0 | 0 |
|  | 1% PPO in DMF |  | 9 | 0 |
|  | 2% PPO in DMF |  | 19 | 0.2 |
|  | 5% PPO in DMF | 25 | 35 | 0.5 |
|  | 10% PPO in DMF |  | 39 | 1.1 |
|  | 20% PPO in DMF |  | 61 | 2.3 |
|  | 40% PPO in DMF | 31 | 81 | 7.3 |

EXAMPLE 3

To produce impregnated strips suitable for use in a wipe test, Whatman #3 MM strips were impregnated with a mixture of 5 parts Triton X-100, 8 parts PPO, and 12 parts dimethylformamide. The solvent was then dried and the resulting strips were able to readily absorb water or other aqueous solutions, as well as non-polar substances. The efficiency of scintillating counting according to this example was 43% for $^{14}C$ and 1.4% for tritium when wiped on a surface containing radioactive isotopes.

Thus, it can readily be seen that the present invention represents a significant improvement over prior art scintillation counting techniques. It will also be apparent to those having skill in the art that a large number of modifications could be made to the invention as disclosed that would still be within the scope of the inventive concepts hereinabove set forth.

I claim:

1. A solid state scintillation counting method comprising the steps of
   contacting a carrier with a detergent,
   contacting said carrier with a radioactive substance,
   applying a scintillating material to said carrier and
   counting scintillations of the material applied to said carrier in a liquid scintillation counter, said carrier being impregnated with the scintillating material, the radioactive substance and the detergent at the time of the counting.

2. The method according to claim 1, further comprising the step of adding a solvent to said scintillating material prior to said applying step, wherein said scintillating material is contained in a solution when applied to said carrier.

3. The method according to claim 2, further comprising the step of drying said solvent after said applying step but before said counting step.

4. The method according to claim 1, further comprising the step of placing said carrier in a scintillation vessel after said applying step and before said counting step.

5. The method according to claim 1, wherein said carrier is a thin layer, further comprising the step of segmenting the carrier before placing said carrier in said scintillation vessel.

6. A solid state scintillation counting method comprising the steps of
   applying a scintillating material to a carrier,
   contacting the carrier with a radioactive substance, and
   counting scintillations of the material applied to said carrier in a liquid scintillation counter, said carrier being impregnated with the scintillating material and the radioactive substance at the time of the counting.

7. The method according to claim 6, further comprising the step of adding a solvent to said scintillating material prior to said applying step, wherein said scintillating material is contained in a solution when applied to said carrier.

8. The method according to claim 6, further comprising the step of adding a detergent to said carrier prior to said contacting step.

9. The method according to claim 6, further comprising the step of adding a solvent and a detergent to said scintillating material prior to said applying step, wherein said scintillating material is contained in a solution when applied to said carrier.

10. The method according to claim 7 or 9, further comprising the step of drying said solvent after said applying step but before said counting step.

11. The method according to claim 6, wherein said applying step comprises the steps of mixing said scintillating material with a carrier substance and then forming said carrier.

12. The method according to claim 6, wherein said applying step comprises the steps of mixing said scintillating material with a solvent and a carrier substance, and then forming said carrier.

13. The method according to claim 6, wherein said applying step comprises the steps of mixing said scintillating material with a solvent, a detergent, and a carrier substance, and then forming said carrier.

14. The method according to claim 6, wherein said carrier is in the form of a strip and said contacting step comprises wiping said strip on a surface containing a radioactive substance.

15. A method for determining amounts of low-energy radioactive isotopes comprising the steps of contacting a strip comprising a carrier, a scintillating material, and a detergent with a surface containing a radioactive substance and then determining radioactivity of the strip in a liquid scintillation counter, said strip being impregnated with the scintillating material, the radioactive substance and the detergent at the time of the counting.

* * * * *